United States Patent
Stählin et al.

(10) Patent No.: US 10,353,076 B2
(45) Date of Patent: Jul. 16, 2019

(54) METHOD FOR PROVIDING A GNSS SIGNAL

(71) Applicant: Continental Teves AG & Co. oHG, Frankfurt (DE)

(72) Inventors: Ulrich Stählin, Eschborn (DE); Klaus Rink, Rodenbach (DE); Marc Menzel, Weimar (DE); Michael Zalewski, Bruchköbel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 182 days.

(21) Appl. No.: 14/650,409

(22) PCT Filed: Dec. 12, 2013

(86) PCT No.: PCT/EP2013/076359
§ 371 (c)(1),
(2) Date: Jun. 8, 2015

(87) PCT Pub. No.: WO2014/095558
PCT Pub. Date: Jun. 26, 2014

(65) Prior Publication Data
US 2015/0309181 A1    Oct. 29, 2015

(30) Foreign Application Priority Data
Dec. 20, 2012 (DE) .................. 10 2012 224 104

(51) Int. Cl.
*G01S 19/22* (2010.01)
*G01S 19/13* (2010.01)
(Continued)

(52) U.S. Cl.
CPC .............. *G01S 19/13* (2013.01); *G01S 19/22* (2013.01); *G01S 19/28* (2013.01); *G01S 19/42* (2013.01); *G01S 19/49* (2013.01)

(58) Field of Classification Search
CPC .......... G01S 19/28; G01S 19/13; G01S 19/22; G01S 19/42; G01S 19/49
(Continued)

(56) References Cited

U.S. PATENT DOCUMENTS 8,717,233 B2   5/2014  Ashjaee
8,855,867 B2   10/2014 Gunther
(Continued)

FOREIGN PATENT DOCUMENTS

CN      102297695      12/2011
DE      102006029148   1/2008
(Continued)

OTHER PUBLICATIONS

Second Chinese Office Action dated Oct. 20, 2016 for Chinese Application No. 201380066539.0, including English translation, 11 pages.
(Continued)

*Primary Examiner* — Lester G Kincaid
*Assistant Examiner* — Dung L Lam
(74) *Attorney, Agent, or Firm* — RatnerPrestia

(57) ABSTRACT

The invention relates to a method for providing a global navigation satellite system signal, referred to as a GNSS signal in the following, for determining a position of a vehicle, the method including: receiving an unfiltered GNSS signal, filtering the unfiltered GNSS signal on the basis of an ambient condition around the vehicle, and emitting the filtered GNSS signal.

9 Claims, 3 Drawing Sheets

(51) Int. Cl.
   *G01S 19/28* (2010.01)
   *G01S 19/42* (2010.01)
   *G01S 19/49* (2010.01)

(58) Field of Classification Search
   USPC .................................................. 342/357.51
   See application file for complete search history.

(56) References Cited

U.S. PATENT DOCUMENTS

| | | | |
|---|---|---|---|
| 9,817,125 B2* | 11/2017 | Liu | G01S 19/22 |
| 2003/0135327 A1* | 7/2003 | Levine | G01C 21/165 |
| | | | 701/500 |
| 2006/0012523 A1* | 1/2006 | Schmid | G01S 3/06 |
| | | | 342/451 |
| 2008/0166011 A1* | 7/2008 | Sever | G01S 19/28 |
| | | | 382/100 |
| 2010/0176992 A1 | 7/2010 | T'siobbel | |
| 2010/0304699 A1* | 12/2010 | Walker | H04L 1/20 |
| | | | 455/226.3 |
| 2014/0104101 A1 | 4/2014 | Mizuochi | |
| 2015/0319729 A1* | 11/2015 | MacGougan | H04W 4/023 |
| | | | 455/456.1 |

FOREIGN PATENT DOCUMENTS

| | | |
|---|---|---|
| DE | 102007038697 | 2/2009 |
| DE | 102007041121 | 3/2009 |
| JP | H07055909 A | 3/1995 |
| JP | 2003004838 | 1/2003 |
| JP | 2007003287 A | 1/2007 |
| JP | 2007093483 | 4/2007 |
| JP | 2008232761 A | 10/2008 |
| JP | 2010164496 | 7/2010 |
| JP | 2010534849 | 11/2010 |
| JP | 2012112959 | 6/2012 |
| JP | 2012159347 A | 8/2012 |
| JP | 2012215485 A | 11/2012 |
| WO | 2006113689 | 10/2006 |
| WO | 2011098333 | 8/2011 |

OTHER PUBLICATIONS

German Search Report for German Application No. 10 2012 224 104.3 dated Sep. 30, 2013, including partial translation.
International Search Report for International Application No. PCT/EP2013/076359 dated Jul. 11, 2014.
Japanese Office Action dated Jun. 17, 2016 for Japanese Application No. 2015-548372, including English translation, 7 pages.
Decision to Decline the Amendment for Japanese Application No. 2015-548372, dated Apr. 26, 2018, 4 pages.

* cited by examiner

METHOD FOR PROVIDING A GNSS SIGNAL

CROSS REFERENCE TO RELATED APPLICATIONS

This application is the U.S. National Phase Application of PCT/EP2013/076359, filed Dec. 12, 2013, which claims priority to German Patent Application No. 10 2012 224 104.3, filed Dec. 20, 2012, the contents of such applications being incorporated by reference herein.

FIELD OF THE INVENTION

The invention relates to a method for providing a GNSS signal, a control device to carry out the method and a vehicle with the control device.

BACKGROUND OF THE INVENTION

From DE 10 2007 038 697 A1, which is incorporated by reference, it is known to exploit statistical properties of an error of a global satellite navigation signal, referred to as a GNSS signal, formed as a Global Positioning System signal, referred to as a GPS signal, in a navigation device in order to improve the position estimation with the GNSS signal.

SUMMARY OF THE INVENTION

An aspect of the invention is to improve the use of a plurality of sensor sizes in order to increase information.

According to one aspect of the invention, a method for providing a GNSS signal for position determination of a vehicle comprises the steps of receiving the GNSS signal, filtering the GNSS signal on the basis of an ambient condition around the vehicle and outputting the filtered GNSS signal.

The aforementioned GPS signal, a Глобальная Навигационная Спутниковая Система signal, referred to as a GLO-NASS signal for short, and/or a Galileo signal can be used as the GNSS signal.

The indicated method is based on the consideration that the statistical properties of the error must first be measured in the aforementioned navigation device in order to be able to use said properties in order to improve the position estimation based on the GNSS signal. The indicated method is furthermore based on the consideration that the error could originate from the ambient condition around the vehicle, such as, for example, from shadowing effects which, in the context of the aforementioned navigation device, could be taken into account to improve the signal only if the GNSS signal is poorer due to the shadowing effects and the error manifests itself as measurable due to the statistical recording. It is subsequently possible to respond to the error, in whatever form it takes, only a posteriori following a deteriorating signal quality of the GNSS signal.

In order to be able to respond more quickly to the signal quality of the GNSS signal deteriorating due to the error, the indicated method is based on the consideration of estimating the signal quality on the basis of the ambient conditions influencing the signal quality. In this way, an expectation value is provided for the signal quality of the GNSS signal which, in the case of a deteriorating signal quality, can be interpreted as a static property of an error of the GNSS signal. It is possible to respond to this expected value, in whatever form it takes, a priori, before the expected deterioration in the signal quality of the GNSS signal actually occurs.

In one development of the indicated method, the ambient condition can be detected by means of environment sensors on the vehicle. In the context of the development, environment sensors are understood above all to mean sensors from which possible shadowing of the GNSS signal can be estimated. Camera sensors, radar sensors, lidar sensors or V2X sensors, for example, can be used for this purpose, said sensors being in any case present on modern vehicles and thus requiring no structural conversion measures on the vehicle for the implementation of the indicated method.

In an additional development of the indicated method, the GNSS signal is weighted for filtering on the basis of an output signal of the environment sensor. In this way, it is possible to classify the environment around the vehicle and, for example, to output the degree of shadowing and therefore the signal quality for the further use of the GNSS signal, for example for error correction, to other modules which use the GNSS signal.

In one further development of the indicated method, the output signal could describe an object on a road on which the vehicle is travelling. In this way, the aforementioned weighting can be carried out according to the structure of the recognized objects, which then essentially indicates how strongly the GNSS signal is shadowed. A tunnel, for example, results, as expected, in a complete shadowing of all available GNSS signals, whereas trees close to the road weakly shadow at least some GNSS signals. Walls of buildings close to the road, on the other hand, can result in a complete shadowing of some GNSS signals and/or in reflections of some GNSS signals. In addition, the reception angle of the GNSS signal can also be taken into account in the weighting of the GNSS signal on the basis of the output signal describing the object, in order to thus further improve the expectation value for the estimated shadowing from the position of the object and the reception angle.

Any given ambient conditions, such as, for example, interference signal fields which influence the signal quality of the GNSS signal could, in principle, be detected in order to estimate the signal quality of the GNSS signal. In one particular development of the indicated method, the GNSS signal is filtered on the basis of an expected degree of shadowing of the GNSS signal by the object as an ambient condition.

According to one further aspect of the invention, a method for determining a position of a vehicle on the basis of a GNSS signal comprises the steps of providing the GNSS signal with an indicated method and determining the position of the vehicle based on the provided GNSS signal.

Through the use of the indicated method for providing a GNSS signal in the position determination, it is possible to respond to anticipated errors in the reception of the GNSS signal and therefore in the position determination before the errors are introduced into the position determination system. For example, before an expected complete shadowing of a GNSS signal, it would be possible, by means of an a priori adaptation of the aforementioned weightings, to switch over successively to a different GNSS signal which replaces the then shadowed GNSS signal.

In one development, the indicated method comprises the step of checking the plausibility of the determined position of the vehicle on the basis of an output signal of an environment sensor of the vehicle.

The development is based on the consideration that, for example, the aforementioned object, the structure of which can be used for the aforementioned weighting of the GNSS signal describing the signal quality, can also be used to check the calculated position of the vehicle on the basis of the GNSS signal. Thus, for example, a change of lane of the vehicle on the road could be tracked with the GNSS signal and the position of the vehicle on the road determined in this way and the plausibility of the GNSS signal could this be checked.

In a different development, the indicated method comprises the steps of detecting reference position data of the vehicle and defining more precisely the position of the vehicle by means of a filtering of the detected position of the vehicle based on the reference position data.

The reference position data could be dependent, for example, on vehicle dynamics data and/or odometry data of the vehicle. This development is based on the consideration that the reference position data could be more precisely defined on the basis of the GNSS signal, for example in a fusion filter. This could be done, for example, by comparing the reference position data with the GNSS signal itself in a filter or by comparing said reference position data with position data derived from the GNSS signal, such as the measuring position data in an observer. An observer of this type may comprise any filter which allows an analog or digital state observation of the vehicle. Thus, for example, a Luenberger observer may be used. If noise is also to be taken into account, a Kalman filter could be considered. If the form of the noise is also to be taken into account, a particle filter could, where appropriate, also be used which has a basic set of available noise scenarios and selects the noise scenario to be taken into account in the elimination, for example by means of a Monte Carlo simulation. The observer is preferably a Kalman filter which delivers an optimum result in terms of its required processing resources.

In one particular development of the indicated method, the more precisely defined position is approximated depending on an information content of the determined position.

The indicated development is based on the consideration that the reference data could represent redundant position data for correcting the position data derived from the GNSS signal. However, a difference between the reference position data and the position data derived from the GNSS signal is required for this correction, in the context of which it would not initially be clear in which of the two available data the error is located. However, this can be determined by means of the aforementioned plausibility check on the position data derived from the GNSS signal and an integrity measure depending, for example, on the communication information content can be allocated to the position data derived from the GNSS signal. The greater/smaller the integrity measure and therefore the communication information content of the position data derived from the GNSS signal, the greater/smaller the error in the reference data must be. The position data derived from the GNSS signal can then be corrected accordingly.

According to one further aspect of the invention, a method for outputting a measuring signal in a vehicle comprises the steps of:
  detecting a sensor signal,
  detecting a comparison sensor signal,
  weighting at least one of the sensor signals on the basis of an estimated error, and
  filtering the sensor signal on the basis of the comparison sensor signal to output the measurement after the weighting.

The indicated method is based on the consideration that errors can only be detected in a fusion sensor as known, for example, from document WO 2011/098 333 A1, which is incorporated by reference, if they have already occurred, since the fusion sensor compares the sensor signal and the comparison signal, interprets differences between the two sensor signals as errors and eliminates the error in the form of a feedback. This results in a corresponding dead time which the estimation of the error in advance and therefore its taking into account before it actually occurs can be avoided.

One of the two sensor signals may, for example, represent the aforementioned reference position data derived from vehicle dynamics data from an inertial sensor, whereas the other sensor signal may, for example, represent the position data derived from a GNSS signal, wherein both sensor signals and the measuring signal indicate a position of the vehicle comprising an absolute position, a speed, an acceleration and a heading of the vehicle. The two sensor signals can be filtered using a filter as described above.

According to one further aspect of the invention, a control device is configured to carry out one of the indicated methods.

In one development of the indicated control device, the indicated device has a memory and a processor. Here, of one indicated method is stored in the memory in the form of computer program and the processor is provided to carry out the method when the computer program is loaded from the memory into the processor.

According to one further aspect of the invention, a computer program comprises program code means in order to carry out all steps of one of the indicated methods when the computer program is executed on the computer or on one of the indicated devices.

According to one further aspect of the invention, a computer program product contains a program code which is stored on a computer-readable data medium and which, when it is executed on a data processing device, carries out one of the indicated methods.

According to one further aspect of the invention, a vehicle comprises an indicated control device.

BRIEF DESCRIPTION OF THE DRAWINGS

The characteristics, features and advantages of this invention described above and the manner in which they are achieved will become clearer and more readily understandable in connection with the following description of the example embodiments which are explained in detail with reference to the drawings, wherein.

DETAILED DESCRIPTION OF THE INVENTION

In the figures, identical technical elements are denoted with identical reference numbers and are described once only.

Figure 1:
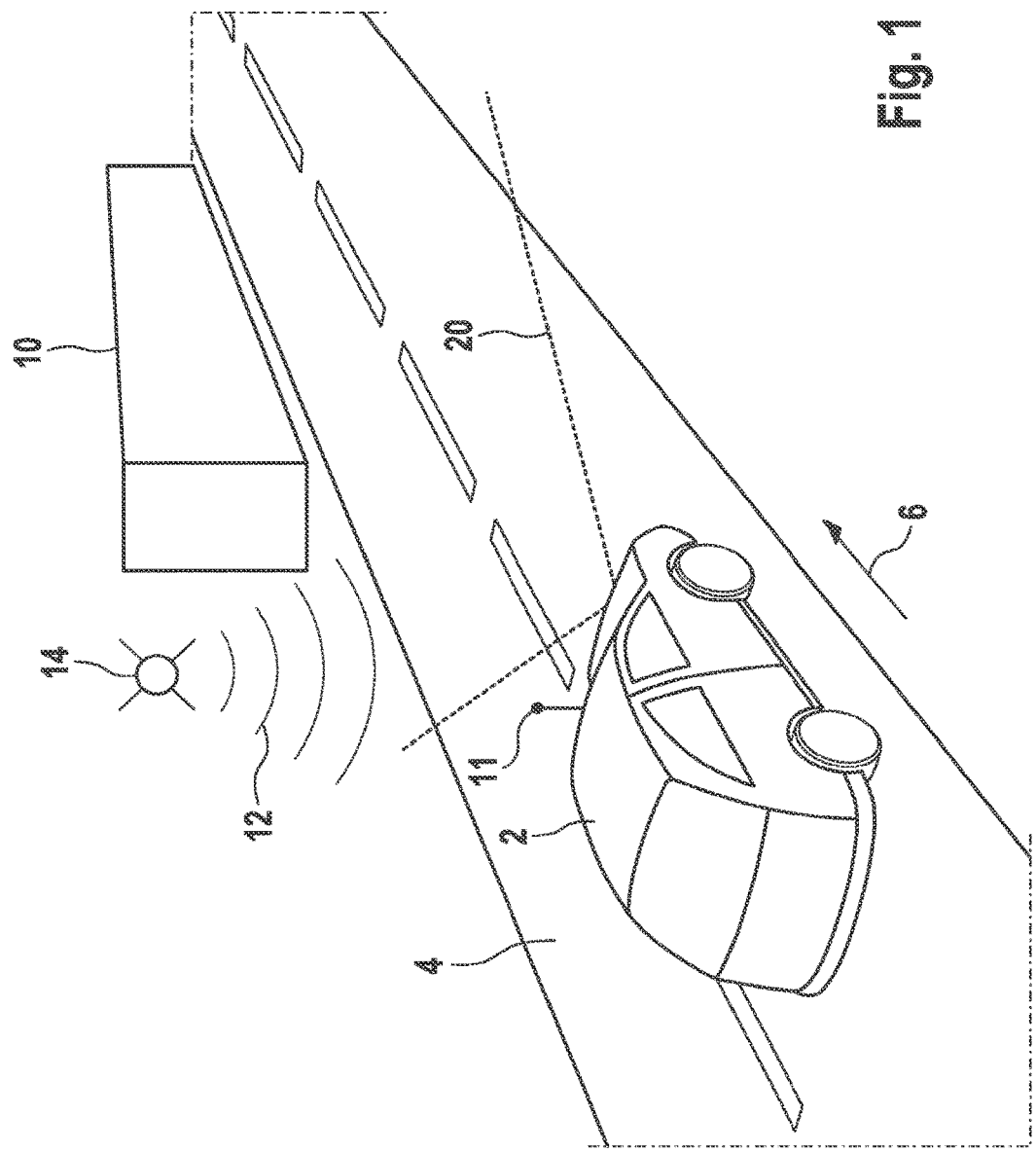
FIG. 1 shows a schematic diagram of a vehicle on a road.

Reference is made to FIG. 1, which shows a schematic diagram of a vehicle 2 on a road 4.

The vehicle 2 moves on the road 4 in a direction of movement 6. An object in the form of a building 10 toward which the vehicle is travelling is located in this direction of movement 6 at the edge of the road 4 in front of the vehicle 2.

Figure 2:
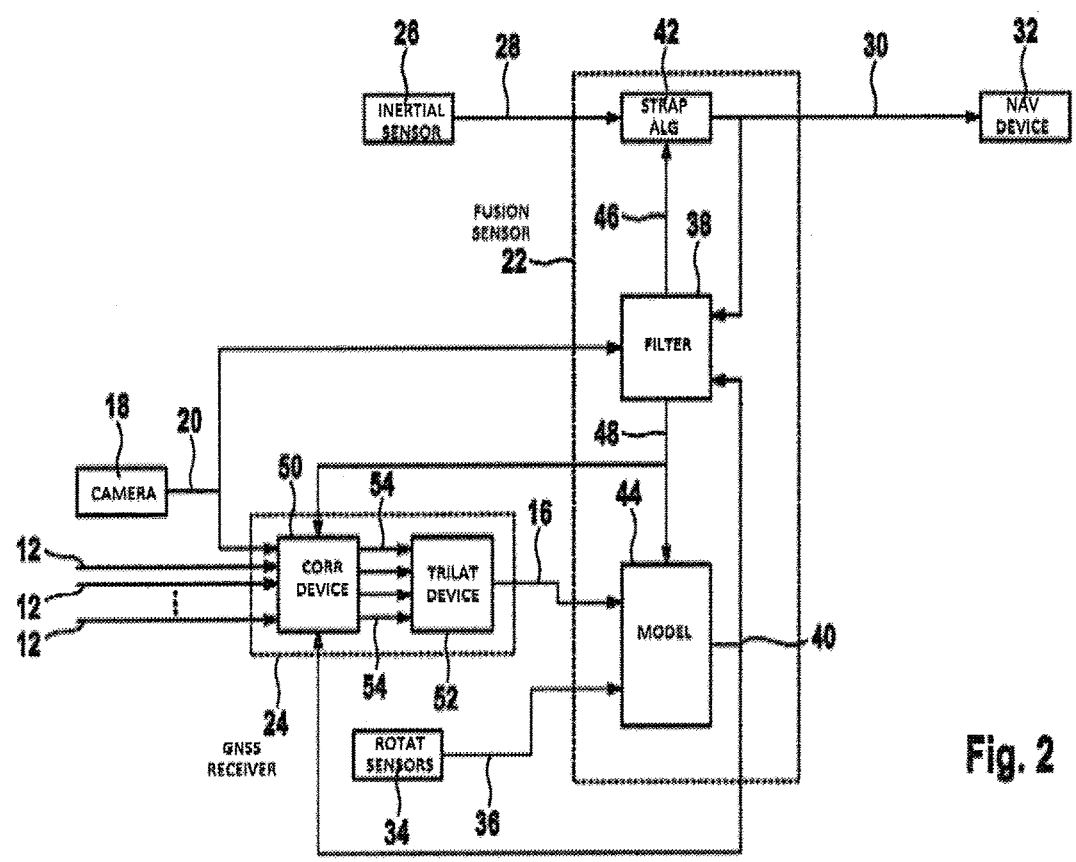
FIG. 2 shows a schematic diagram of a fusion sensor in the vehicle shown in FIG. 1.

In the present embodiment, the vehicle 2 is intended to receive a GNSS signal (FIG. 3 Step 300) via an antenna 11 from a global satellite navigation system, referred to below as GNSS, via a plurality of GNSS satellites, of which one GNSS satellite 14 is shown in FIG. 1, and a position 16 of the vehicle 2 on the road 4 indicated in FIG. 2 is to be determined on the basis of a trilateration known per se.

However, it may occur during the trilateration that the signal quality of at least one of the GNSS signals deteriorates, which may influence the precision of the determined position 16 of the vehicle 2. In the present embodiment, the indicated GNSS satellite 12 is hidden by the building 10 as the vehicle 2 travels in the direction of movement 6, as a result of which the GNSS signal 12 is shadowed in relation to the vehicle and can no longer be used with a sufficiently high signal quality for a precise determination of the position of the vehicle 2.

In the context of the present embodiment, precautions must be taken here sufficiently quickly in order to reduce the effects of the shadowing of the GNSS signal 12 as far as possible.

Figure 3:
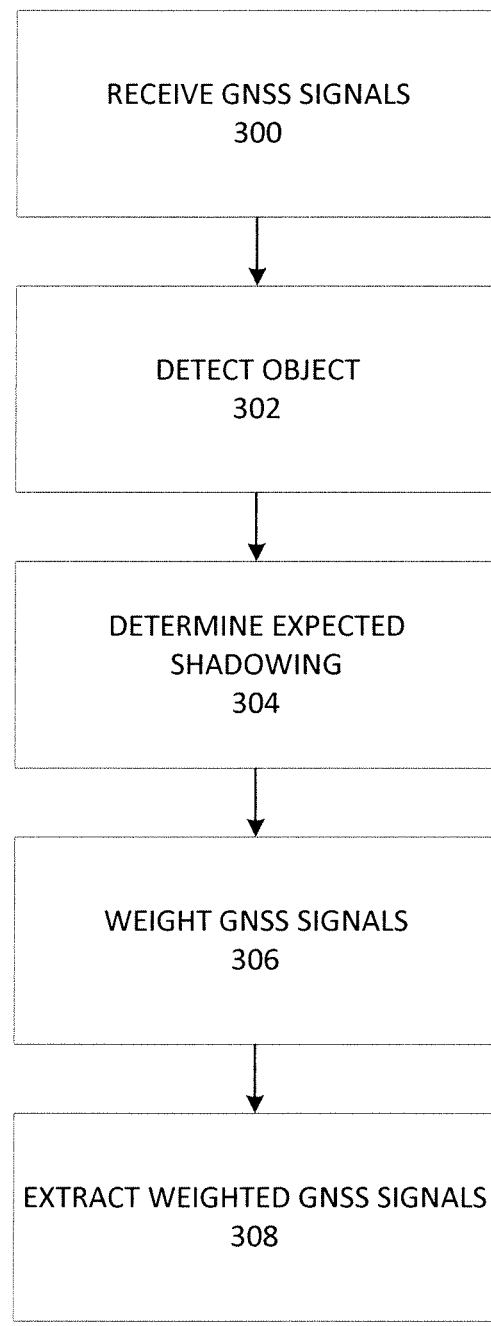
FIG. 3 shows a flowchart of the fusion sensor operation.

For this purpose, a camera 18 shown in FIG. 2 is disposed in the vehicle 2, said camera recording an image 20 which, viewed in the direction of movement 6 of the vehicle 2, is positioned in front of the vehicle 2. The building 10 can be recognized (FIG. 3 Step 302) in this image 20, as a result of which the imminent shadowing of the GNSS signal 12 by the building is also recognizable (FIG. 3 Step 304).

This idea is intended to be used in the present embodiment to minimize the effects of the shadowing of the GNSS signal 12 by the building.

For this purpose, reference is made to FIG. 2, which shows a fusion sensor 22 in the vehicle 2 shown in FIG. 1.

In the present embodiment, the fusion sensor 22 receives the aforementioned position 16 of the vehicle 2, via a GNSS receiver 24 still to be described, in the form of data which may comprise an absolute position of the vehicle 2 on a road 4. Along with the absolute position, the position data 16 from the GNSS receiver 6 may also comprise a speed of the vehicle 2 and its heading in relation to the GNSS satellite 14. Since the position data 16 are derived from the GNSS signals 12, they are referred to below as GNSS position data 16.

The fusion sensor 22 is designed in a manner still to be described in such a way as to increase the information content of the GNSS position data 16 derived from the GNSS signal 12. On the one hand, this is necessary since the GNSS signal 12 may have a very high signal-to-noise ratio and may thus be very inaccurate. On the other hand, as already explained, the GNSS signal 12 is not constantly available due to shadowing.

In the present embodiment, the vehicle 2 has an inertial sensor 26 for this purpose which detects vehicle dynamics data 28 of the vehicle 2. As is known, said data include a longitudinal acceleration, a transverse acceleration and a vertical acceleration, and a roll rate, pitch rate and yaw rate of the vehicle 2. These vehicle dynamics data 26 are used in the present embodiment in order to increase the information content of the GNSS position data 16 and, for example, to precisely define the speed of the vehicle 2 on the road 4. The precisely defined position data 30 can then, for example, be used by a navigation device 32 in the vehicle 2 even if the GNSS signal 12 is no longer available at all, for example due to the shadowing building 10.

Wheel rotational speed sensors 34 which detect the wheel rotational speeds 36 of the individual wheels, which are not referenced in detail, of the vehicle 2 can optionally also be used in the present embodiment in order to further increase the information content of the GNSS position data 16.

In order to increase the aforementioned basic idea of the fusion sensor 22, the signal-to-noise ratio in the position data 16 and/or the vehicle dynamics data 28, the information from the GNSS position data 16 are compared with the vehicle dynamics data 28 from the inertial sensor 14 in a filter 38. To do this, the filter 38 may be designed in any way, but a Kalman filter achieves this object most effectively with a comparatively low processing resource requirement. The filter 38 below is therefore preferably intended to be a Kalman filter 38.

The precisely defined position data 30 of the vehicle 2 and the comparison position data 40 of the vehicle 2 are fed into the Kalman filter 38. In the present embodiment, the precisely defined position data 30 are generated from the vehicle dynamics data 28 in a strapdown algorithm 42 known, for example, from DE 10 2006 029 148 A1, which is incorporated by reference. They contain precisely defined position information relating to the vehicle, but also other position data relating to the vehicle 2, such as, for example its speed, its acceleration and its heading. On the other hand, the comparison position data 40 are obtained from a model 44 of the vehicle 2 which is initially fed from the GNSS receiver 24 with the GNSS position data 16. The comparison data 40, which contain the same information as the precisely defined position data 30, are then determined in the model 44 from these GNSS position data 16. The precisely defined position data 30 and the comparison data 40 differ only in their values.

The Kalman filter 38 calculates an error budget 46 for the precisely defined position data 30 and an error budget 48 for the comparison data 40 on the basis of the precisely defined position data 30 and the comparison position data 40. An error budget is intended to be understood below to mean a total error in a signal which consists of different individual errors in the acquisition and transmission of the signal. In the GNSS signal 12 and therefore in the GNSS position data 16, a corresponding error budget may comprise errors of the satellite orbit, the satellite clock, the residual refraction effects and errors in the GNSS receiver 24.

The error budget 46 of the precisely defined position data 18 and the error budget 48 of the comparison position data 34 are then fed accordingly to the strapdown algorithm 36 and the model 44 for correcting the precisely defined position data 30 and the comparison data 40. This means that the precisely defined position data 30 and the comparison position data 40 are iteratively purged of their errors. By the same token, the error budget 48 of the comparison position data 40 can also be fed to the GNSS receiver 24 so that the latter can iteratively eliminate the aforementioned errors of the satellite orbit, the satellite clock and the residual refraction effects. A GNSS system of this type is also referred to as a deeply coupled GNSS.

In the present embodiment, the GNSS receiver 24 has a selection and correction device 50 and a trilateration device 52 for this purpose.

The selection and correction device 50 selects four GNSS signals 12 from all received GNSS signals 12. The GNSS position data 16 of the vehicle 2 are then determined in the trilateration device 52 in a manner known to the person skilled in the art from the GNSS signals 54 selected in this way, not all of which are denoted with a reference number in FIG. 2 for the sake of clarity.

The aforementioned selection (FIG. 3 Step 308) of the GNSS signals 12 is carried out in the present embodiment on the basis of a weighting (FIG. 3 Step 306) of the GNSS signals 12, wherein the individual weighting factors can be determined on the basis of the error budget 48. In principle, however, an error that could be fed back must first exist for this weighting. Until the existing error is fed back into the selection and correction device 50 of the GNSS receiver 24, a time, known to the person skilled in the art as the dead time, elapses in which an errored GNSS signal continually increases an error in the GNSS position data 16 and therefore in the precisely defined position data 30.

It would therefore be desirable to bridge this dead time.

As already mentioned above in the context of FIG. 1, the shadowing of the GNSS satellite 14 similarly represents an aforementioned error which would manifest itself in the error budget 48 and therefore in the fed back error. However, the dead time can be bridged here since the error is already detected in advance from the image 20 which the aforementioned camera 18 records in the direction of movement 6 in front of the vehicle 2.

On the basis of the information from this image 20, the GNSS signals 12 could similarly be weighted and thus selected (FIG. 3 Steps 306 and 308), whereby a defective GNSS satellite 14 could be predictively detected. In this way, for example, the weighting of the GNSS satellite 14 shown in FIG. 1 could be successively modified until the GNSS satellite 14 is extracted in a timely manner by the selection and correction device 50 of the GNSS receiver 24 before it introduces errors into the GNSS position data 16 due to its shadowing.

To implement this idea, the selection and correction device 50 of the GNSS receiver 24 receives the image 20 and carries out an object recognition, not represented in further detail but known to the person skilled in the art, on the image 20. The object recognition can be carried out in terms of specific classes of objects. For example, these object classes can be divided up as follows:
  tunnels completely shadowing all GNSS signals 12,
  buildings 10 shadowing some of the GNSS signals 12, or
  trees only partially shadowing some of the GNSS signals 12.

If a potential shadowing object, such as, for example, the building 10 shown in FIG. 1, is recognized, the GNSS satellites 14 which would be affected by a shadowing due to the shadowing object can be determined on the basis of the comparison data 40 (or other available position data of the vehicle 2). The distance from the vehicle to this shadowing object and therefore information indicating when the shadowing object shadows the affected GNSS satellite 14 could then be determined. Correspondingly, the selection and correction device 50 of the GNSS receiver 24 can then successively increase the weighting of the affected GNSS signal 12 in the manner described above.

The idea described above could also be implemented alternatively or additionally in the Kalman filter 38 (or any other of the aforementioned filters) in order to detect an error in the comparison position data 40 compared with the precisely defined position data 30 in a timely manner before its occurrence. The Kalman filter 38 could receive the image 20, detect the shadowing object in the image 20 and weight the comparison position data 40 in the case of an error in such a way that the comparison position data 40 are taken into account less heavily in the filtering of the comparison position data 40 and the precisely defined position data 30.

The invention claimed is:

1. A method for providing a global navigation satellite system signal referred to below as a GNSS signal, for determining a position of a vehicle, comprising the steps of:
   receiving, by a receiver in the vehicle, a plurality of GNSS signals from a plurality of respective GNSS satellites,
   detecting, by an environment sensor in the vehicle, an object around the vehicle,
   prior to the object shadowing a GNSS signal of the plurality of GNSS signals from the vehicle:
     determining, by a fusion sensor, a distance from the position of the vehicle to a position of the object,
     determining, by the fusion sensor, that upon further travel by the vehicle, the object is expected to shadow the GNSS signal, and
     determining, by the fusion sensor based on the distance from the position of the vehicle to a position of the object, when the object is expected to shadow the GNSS signal,
   determining, by the fusion sensor, respective error budgets for each of the plurality of GNSS signals, wherein the error budget of the GNSS signal is based on error introduced from the expected shadowing,
   determining, by the fusion sensor, respective weighting factors for each of the plurality of GNSS signals based on the respective error budgets,
   selecting, by the fusion sensor, a subset of the plurality of GNSS signals based on the respective weighting factors, the subset including the GNSS signal,
   successively modifying, by at least one of the receiver and the fusion sensor in the vehicle, the weighting factor of the GNSS signal on the basis of when the object is expected to shadow the GNSS signal and affect the error budget, and
   in response to the successively modifying the weighting factor, extracting, by the fusion sensor in the vehicle, the weighted GNSS signal before an error is introduced into the determined position of the vehicle due to shadowing.

2. The method as claimed in claim 1, wherein the GNSS signal is weighted for filtering on the basis of an output signal of the environment sensor.

3. The method as claimed in claim 2, wherein the output signal describes an object on a road on which the vehicle is travelling.

4. The method as claimed in claim 3, further comprising:
   detecting, by a reference sensor, reference position data of the vehicle, and
   precisely defining the position of the vehicle by a filtering of the detected position of the vehicle on the basis of the reference position data detected by the reference sensor.

5. A method for determining a position of a vehicle on the basis of a GNSS signal, comprising the steps of:
   providing the GNSS signal with a method as claimed in claim 1, and
   determining the position of the vehicle on the basis of the provided GNSS signal.

6. The method as claimed in claim 5, further comprising:
   checking the plausibility of the determined position of the vehicle on the basis of an output signal of an environment sensor of the vehicle.

7. The method as claimed in claim 5, further comprising:
   detecting reference position data of the vehicle, and
   precisely defining the position of the vehicle by a filtering of the determined position of the vehicle on the basis of the reference position data.

8. The method as claimed in claim 1, further comprising:
   detecting a comparison sensor signal,
   weighting, by the fusion sensor, the GNSS signal on the basis of an estimated error, and
   filtering, by the fusion sensor, the sensor signal on the basis of the comparison sensor signal.

9. A system for determining a position of a vehicle, the system including:

a receiver in the vehicle, configured to receive a plurality of GNSS signals from a plurality of respective GNSS satellites;

an environment sensor in the vehicle, configured to detect an object around the vehicle; and a fusion sensor in the vehicle, the fusion sensor, prior to the object shadowing a GNSS signal of the plurality of GNSS signals from the vehicle, configured to:

determine a distance from the position of the vehicle to a position of the object, determine that upon further travel by the vehicle, the object is expected to shadow the GNSS signal, determine based on the distance from the position of the vehicle to a position of the object, when the object is expected to shadow the GNSS signal, determine respective error budgets for each of the plurality of GNSS signals, wherein the error budget of the GNSS signal is based on error introduced from the expected shadowing, determine respective weighting factors for each of the plurality of GNSS signals based on the respective error budgets, determine a subset of the plurality of GNSS signals based on the respective weighting factors, the subset including the GNSS signal, successively modify the weighting factor of the GNSS signal on the basis of when the object is expected to shadow the GNSS signal and affect the error budget, and in response to the successive modification of the weighting factor, extract the weighted GNSS signal before an error is introduced into the determined position of the vehicle due to shadowing.

* * * * *